(No Model.)
A. H. COWLES.
PROCESS OF PRODUCING METALLIC CARBIDS.
No. 590,514. Patented Sept. 21, 1897.
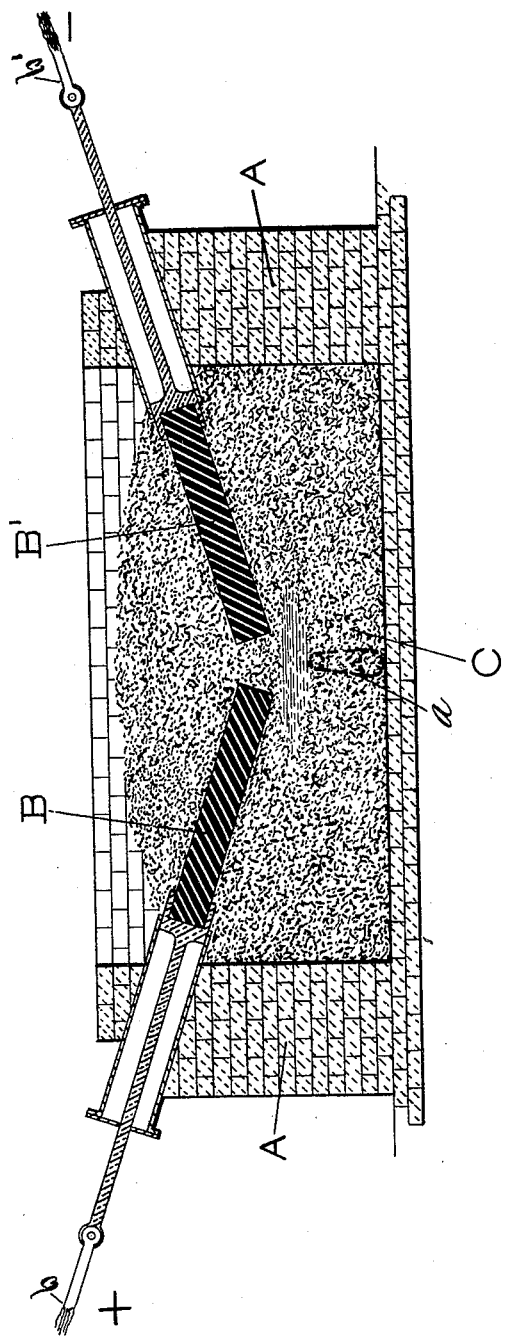
WITNESSES.
INVENTOR
Alfred H. Cowles

UNITED STATES PATENT OFFICE.

ALFRED H. COWLES, OF CLEVELAND, OHIO, ASSIGNOR, BY MESNE ASSIGNMENTS, TO THE ELECTRO GAS COMPANY, OF WEST VIRGINIA.

PROCESS OF PRODUCING METALLIC CARBIDS.

SPECIFICATION forming part of Letters Patent No. 590,514, dated September 21, 1897.

Application filed August 19, 1895. Serial No. 559,726. (No specimens.)

*To all whom it may concern:*

Be it known that I, ALFRED H. COWLES, of Cleveland, county of Cuyahoga, State of Ohio, have invented a new and useful Improvement in Processes of Producing Metallic Carbids, of which the following is a full, true, and exact description, reference being had to the accompanying drawing.

This invention relates to an improved process for forming metallic carbids by the union of carbon and a metal, the said union being accomplished by the simultaneous reduction of an oxid of the metal and the union of the reduced metal with finely-comminuted carbon, which thus serves the double purpose of primarily in part combining with the oxygen of the oxid and subsequently with the reduced metal. This process is carried out by causing the lateral withdrawal of electrodes, preferably of carbon projecting into and buried in a mass of the commingled metallic oxid and carbon, and then withdrawing them laterally beneath the mass as the material is acted upon between them. By this process the two electrodes are protected from the oxidizing effect of the atmosphere by the contact of material containing carbon therewith, while at the same time the said material serves as a heat-insulator, retaining the heat in the cavity between them, and the material above falls into the interspace and is there gradually converted into carbid by the arc flowing between such poles. As an example of the production of such metallic carbids I describe the production of calcium carbid.

In carrying out my process I proceed as follows: I take finely-divided coke and lime intimately commingled and I mingle them thoroughly in atomic proportions, which should be, making due allowance for the reduction of the CaO to Ca and then the formation of the calcium carbid, ($CaC_2$,) CO passing off as gas, 60.9 per cent. of lime and 39.1 per cent. of coke. Some deviation from the specific atomic proportions has to be made to secure the best results to allow for certain factors, which tend to modify it under the conditions attending actual practice. For example, a slight supply of carbon from the carbon electrodes tends to lessen the amount of carbon that needs to be present in the mixture. A volatilization of some of the metal calcium and a reoxidization of it, it passing off as fumes to a degree variable with the type of the furnace and the amount of energy delivered thereto, tends also to lessen the amount of carbon needed in the mixture, as the calcium vapor that escapes does not unite with any carbon. Superficial combustion of a little of the carbon on the surface calls for a slight increase of carbon in the mixture as a whole, and allowance must be made when doing close work for moisture present in the lime and coke. I then subject the mixture to the action of the electric current in a furnace—such, for example, as that shown in the accompanying drawing, which is a vertical longitudinal section, and in which—

A is an elongated furnace-chamber.

B B' are carbon electrodes entering through the end walls of the trough-like chamber and inclined downward and adapted to meet at the center of the chamber. These electrodes can be drawn out or pushed in, as required, and they are respectively connected to the cables $b$ $b'$ of the electric circuit. For effective work the current employed should have from forty to seventy volts and an amperage depending upon the size of the furnace and amount of material to be produced. The mixture of lime and coke in the furnace is indicated at C.

The ends of the electrodes at the start are brought close together and an arc forms between them, smelting the mixture in its vicinity and forming the calcium carbid. The reduction of the material around and below the ends of the electrodes produces a sump within the charge and a pool of the molten calcium carbid forms therein. As the reduction progresses the electrodes are retracted, and an arc then forms between each electrode and the bath of calcium carbid beneath. At this stage of the operation of the furnace, which becomes the working condition of the electrodes, there are two centers of electrical energy at a short distance from each other, the current flowing in opposite directions therethrough from one electrode downward to the molten carbid and from the molten pool upward to the other electrode. Additional material is from time to time shoveled in onto it and feeds downward between and around the ends of the electrodes. A portion of the pool of calcium carbid may be from time to time tapped out by pushing a bar through a side hole in the furnace-wall obliquely, up through the outlying portion of the charge, into the sump formed below the electrodes. The point for tapping off is indicated in dotted lines at *a*.

The hole forms a sufficiently open channel for the flow of the molten carbid, and it is closed with a plug in the usual way when enough has been tapped off. The liquid calcium carbid produced, when allowed to cool, crystallizes into the form above described, and when broken exhibits iridescent surfaces.

What I claim as my invention, and desire to secure by Letters Patent, is—

The herein-described process of making calcium carbid, which consists in causing a current to pass between electrodes laterally projecting into a mass of intimately-commingled calcium oxid and carbon of such extent that a material proportion thereof will remain undecomposed by the passage of the current, and in gradually separating the electrodes as the material between them is reduced so as to produce between the electrodes a body of the carbid surrounded by an undecomposed mass of the mixture, substantially as described.

In testimony whereof I have signed my name to this specification in the presence of two subscribing witnesses.

ALFRED H. COWLES.

Witnesses:
 STORY B. LADD,
 JOHN E. DENSY.